Dec. 13, 1927.

W. E. BELKE

FILTERING APPARATUS

Filed Sept. 11, 1926

Inventor:
William E. Belke
By Arthur H. Durand
Atty.

Dec. 13, 1927.
W. E. BELKE
FILTERING APPARATUS
Filed Sept. 11, 1926
1,652,423
2 Sheets-Sheet 2
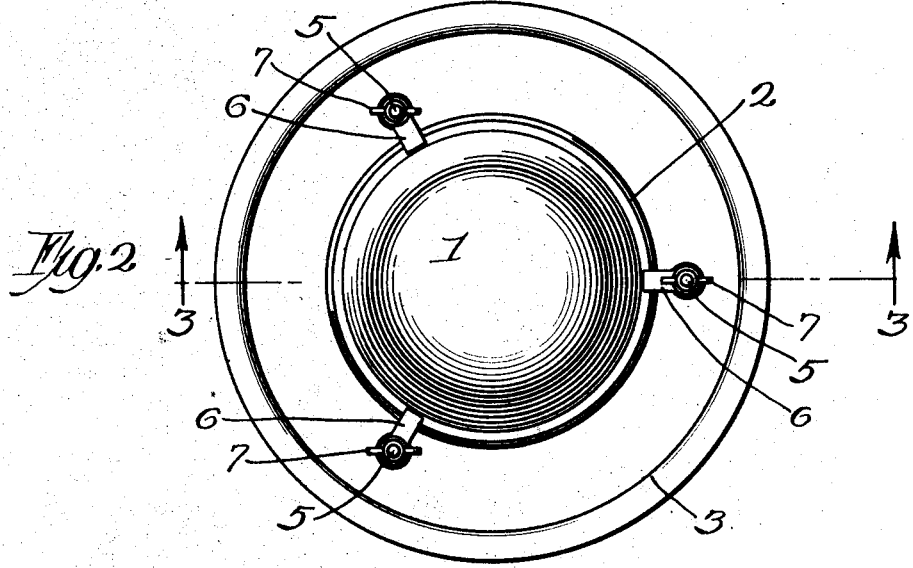
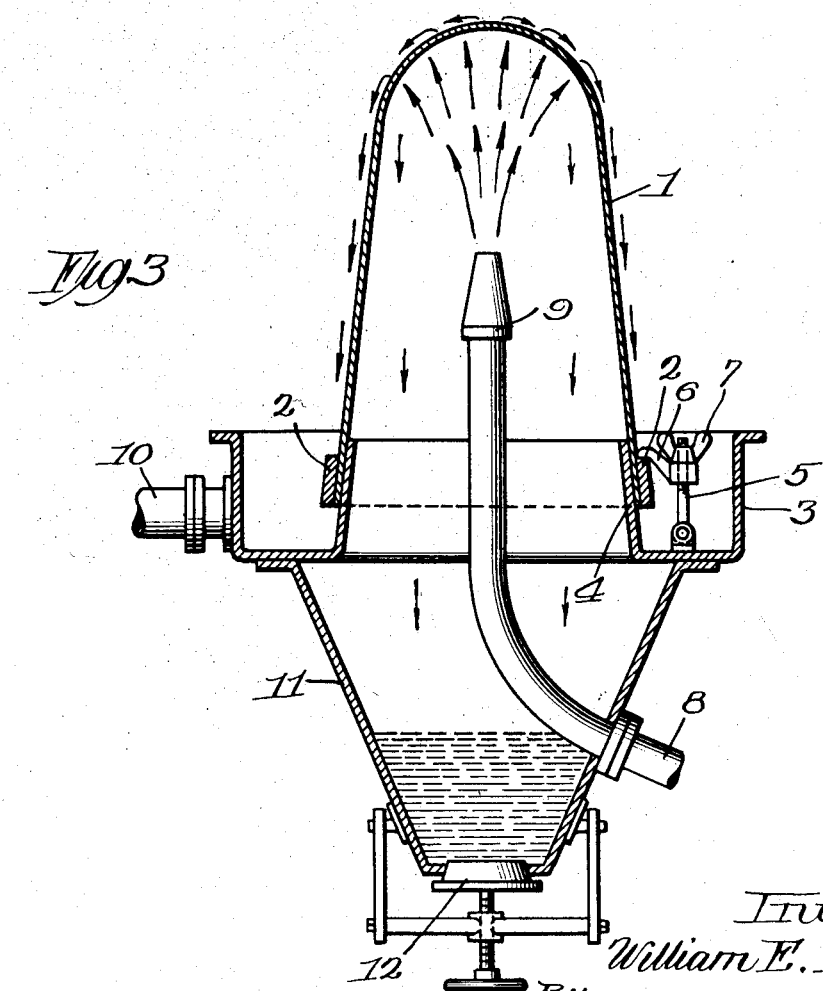

Patented Dec. 13, 1927.

UNITED STATES PATENT OFFICE.

1,652,423

WILLIAM E. BELKE, OF CHICAGO, ILLINOIS.

FILTERING APPARATUS.

Application filed September 11, 1926. Serial No. 134,922.

This invention relates to filtering apparatus in general, but more particularly to apparatus for filtering an electroplating solution.

Generally stated, the object of the invention is to provide a novel and improved filtering apparatus for use in various ways, and for various purposes, having advantages and characteristics and features of construction tending to render it more satisfactory in use, than others heretofore employed for similar purposes, and tending to make it possible to provide a satisfactory and effective filtering apparatus of comparatively inexpensive form.

A special object is to provide a novel and improved construction and arrangement and organization whereby the complete filtering apparatus is in the form of a self-contained and portable unit.

Another object is to provide a novel and improved construction and arrangement whereby the porous or other filtering medium is self-cleaning, so to speak, and is prevented from becoming clogged by the dirt or impurities or other substance or matter to be filtered out of the electroplating solution, or to be removed from any other liquid.

It is also an object to provide certain details and features of construction and combinations tending to increase the general efficiency and the desirability of a filtering apparatus of this particular character.

To these and other useful ends, the invention consists of matters hereinafter set forth and claimed and shown in the accompanying drawings in which—

Fig. 2 is a plan view of the upper or top portion of said apparatus.

Fig. 3 is a vertical section on line 3—3 in Fig. 2.

Figure 1:
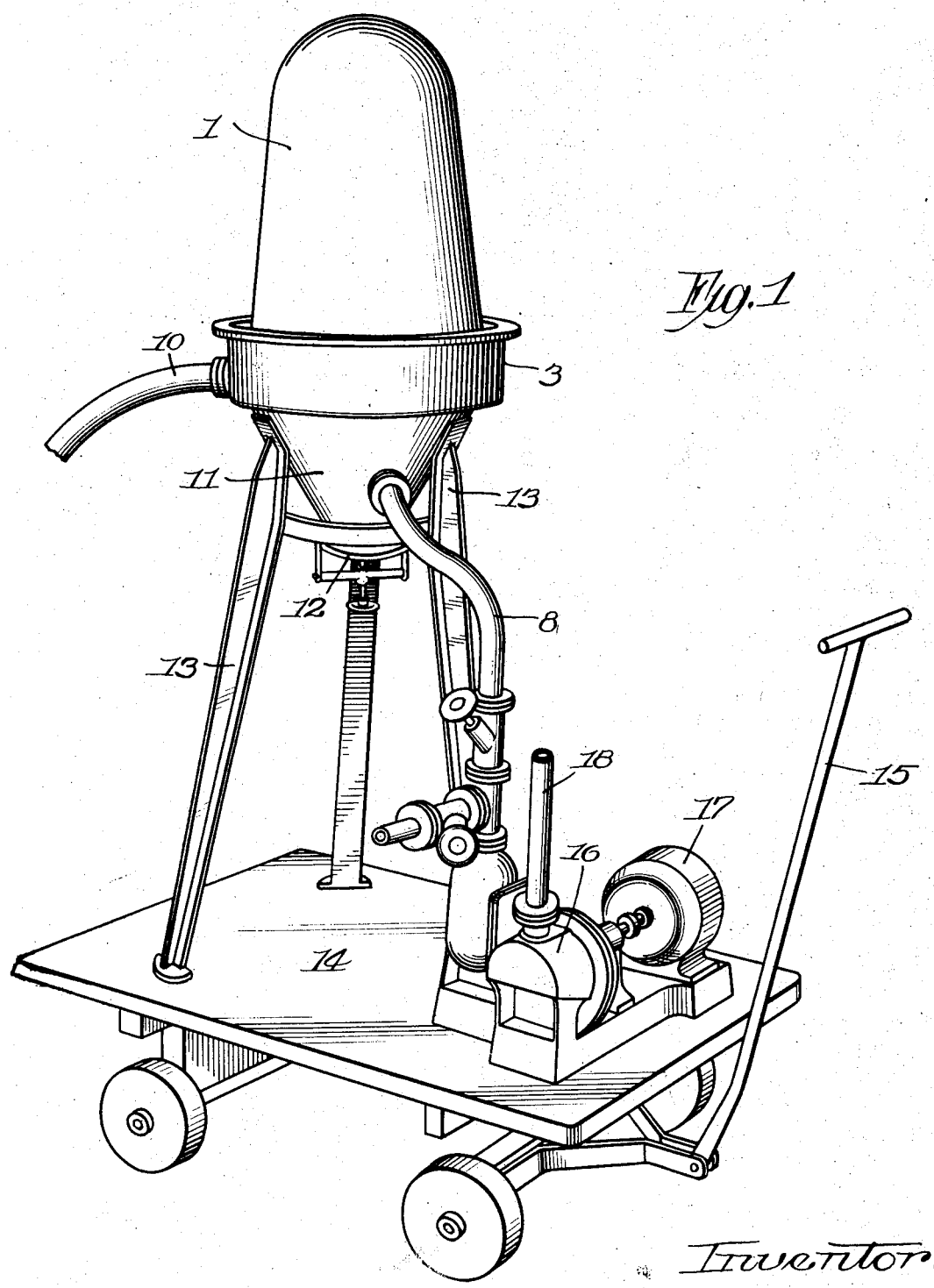
Fig. 1 is a perspective of a filtering apparatus embodying the principles of the invention.

As thus illustrated, the invention comprises a filtering medium 1 in the form of what is called a hat, of felt or other suitable filtering material, secured at its lower edge to a metal ring or band 2 by which it is held in place. The base 3 has an upwardly tapered portion 4 upon which the tapered hat or filtering medium is tightly fitted, and held in place, and for this purpose swinging eyebolts 5 are mounted on the annular trough of the base 3 and provided with lugs 6 to engage the ring 2, and thumb nuts 7 to hold these lugs firmly down against the said ring. The liquid to be filtered is taken in below through a pipe 8 which is connected to the vertically disposed nozzle 9 which is enclosed by the hat or filter medium 1 in the manner shown in Fig. 3 of the drawings. The liquid is projected upwardly in a jet, against the top portion of the hat or filtering medium 1, and the liquid passes through the filtering material and flows down the outside of the hat and into the trough of the base 3, and from this trough the liquid is taken off through a pipe 10 and disposed of in any suitable manner. The dirt or impurities or other substance or matter which does not pass through the filtering medium 1 will drop downward into the well or pan 11 upon which the base 3 is mounted. The lower end of this pan or receptacle 11 is provided with a closure 12, of any suitable character, and this closure can be removed to discharge the accumulation within the pan 11, and for permitting the washing out of the apparatus by the forcing of clean water through the pipe 8 to the nozzle 9, in a manner that can be readily understood.

Preferably, as shown in Fig. 1, the receptacle or pan 11 is mounted on legs 13 which are supported at their lower ends upon the body 14 of a wheeled vehicle having a handle 15 or other suitable means for propelling it along the floor. A pump 16, driven by a suitable motor 17, has an intake pipe 18, and the previously mentioned pipe 8 forms the offtake of said pump, whereby the liquid to be filtered is forced by said pump through the pipe 8 to the nozzle 9 previously described. With the filtering apparatus thus mounted in elevated position, on the truck or other vehicle, the filtered liquid has a gravity discharge therefrom, so that power is only needed for the pumping of the liquid into the filtering apparatus, and not for the discharge of the filtered liquid therefrom.

When necessary or desirable the nuts 7 can be unscrewed to detach the hat or filtering medium 1 and its ring 2 from the base 3, and in this way the filtering medium can be taken off for repairs, or for cleaning, or for the substitution of a new hat or filtering medium when necessary.

It will be understood, of course, that the unfiltered liquid is preferably discharged against the inner surface of the filtering medium 1 with sufficient force to prevent the liquid, or any substantial portion thereof, from falling downward into the receptacle 11, causing practically all of the liquid to pass through the filtering medium and flow down the outside thereof. Therefore, the filtering medium is preferably of a character to permit all of the liquid to pass through, with any given force or pressure, but preventing the liquid from passing through the filtering medium with force enough to carry it away from the outer surface of said medium, whereby practically only the matter taken out of the liquid will remain inside of the filtering medium or hat 1, while practically all of the liquid will pass through the filtering medium and flow down the outside thereof.

Without disclaiming anything and without prejudice to any novelty disclosed, what I claim as my invention is:

1. In filtering apparatus, the combination of a filtering medium, instrumentalities for holding said filtering medium in position, a nozzle disposed below said filtering medium, in position to project the liquid to be filtered against the under side of said medium, said medium having an outside surface for flowing the filtered liquid downward thereon, and means for supplying the liquid to be filtered to said nozzle under pressure.

2. A structure as specified in claim 1, said filtering medium being in the form of a hat with a base portion, and said instrumentalities comprising a trough to receive the filtered liquid which flows down the outside of the hat, having means for detachably holding the base portion of the hat in position in said trough, together with an outlet for said trough.

3. A structure as specified in claim 1, said filtering medium being in the form of a hat with a base portion, and said instrumentalities comprising a trough to receive the filtered liquid which flows down the outside of the hat, having means for detachably holding the base portion of the hat in position in said trough, together with an outlet for said trough, in combination with a receptacle immediately below said hat for catching the matter removed from the liquid by said apparatus and means for discharging the accumulation from said receptacle.

4. A structure as specified in claim 1, in combination with a portable base upon which said filtering medium and its supporting instrumentalities are mounted in elevated position, and a power driven pump disposed below on said base and connected to said nozzle, whereby the unfiltered liquid is supplied by the pump to the filtering medium, means whereby the filtered liquid has a gravity discharge from said instrumentalities for supporting the filtering medium, and wheels for said base, the structure forming a self-contained portable filtering apparatus which can be easily moved around on said wheels.

5. A structure as specified in claim 1, in combination with means below the nozzle to catch the matter taken out of the liquid by said filtering medium, as said matter falls from the under side of said medium.

6. In filtering apparatus, the combination of a portable base, wheels for said base, a filtering medium, means to support the filtering medium in elevated position on said base, a gravity offtake for said filtering medium, for the filtered liquid, means to collect the liquid that passes through said medium and communicating with said offtake, and means including a pump disposed below on said base and having its offtake or discharge suitably connected to supply the unfiltered liquid to said filtering medium, the structure forming a self-contained portable filtering apparatus which can be easily moved around on said wheels, and including a motor to operate said pump.

7. In filtering apparatus, the combination of a filtering medium, instrumentalities for holding said filtering medium in position, a nozzle disposed below said filtering medium, in position to project the liquid to be filtered against the under side of said medium, and means for supplying the liquid to be filtered to said nozzle under pressure, said filtering medium being in the form of a hat with a base portion, and said instrumentalities comprising a trough to receive the filtered liquid which flows down the outside of the hat, having means for detachably holding the base portion of the hat in position in said trough, together with an outlet for said trough.

8. In filtering apparatus, the combination of a filtering medium, instrumentalities for holding said filtering medium in position, a nozzle disposed below said filtering medium, in position to project the liquid to be filtered against the under side of said medium, and means for supplying the liquid to be filtered to said nozzle under pressure, said filtering medium being in the form of a hat with a base portion, and said instrumentalities comprising a trough to receive the filtered liquid which flows down the outside of the hat, having means for detachably holding the base portion of the hat in position in said trough, together with an outlet for said trough, in combination with a receptacle immediately below said hat for catching the matter removed from the liquid by said apparatus and means for discharging the accumulation from said receptacle.

9. In a filtering apparatus, the combination of a hollow filtering member having an open bottom and a closed top, the top being of material forming a filter member, means inside of said member to discharge the unfiltered liquid upwardly against the under side of said top, causing the liquid to pass through the filtering member and then flow down the sides of said member, and a collector forming a supporting base for said member, to collect the filtered liquid that flows down the outer surface of said member.

10. A structure as specified in claim 9, said member being exposed to the atmosphere and being removably mounted at its base, whereby said member is detachable upwardly from said collector.

11. A structure as specified in claim 9, in combination with a receptacle to catch the drippings from the inner surface of said member, and means for discharging the contents of said receptacle.

Specification signed this 7th day of Sept., 1926.

WM. E. BELKE.